Figure 3:
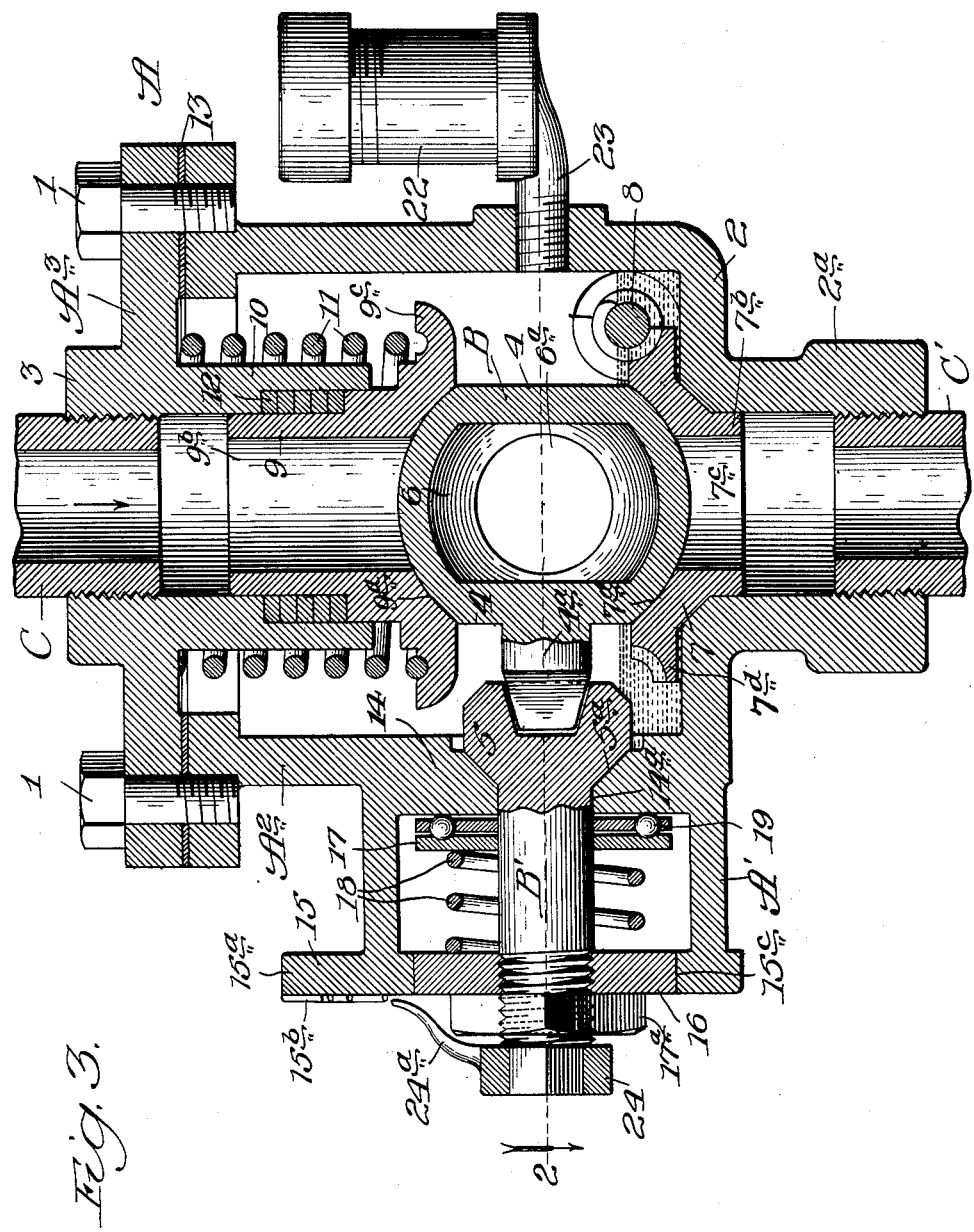

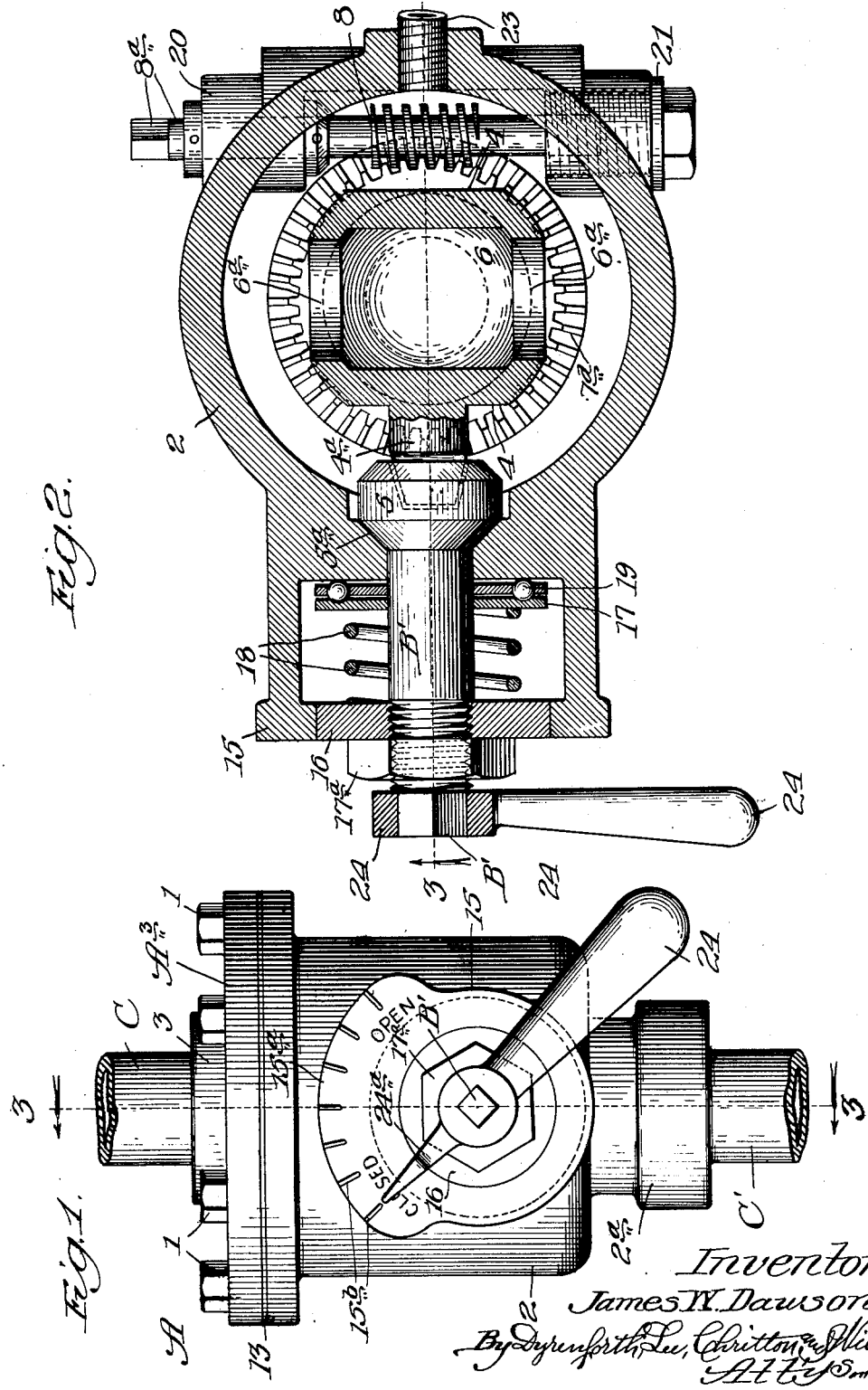

July 22, 1930. J. W. DAWSON 1,770,900
VALVE
Filed Dec. 9, 1926 2 Sheets-Sheet 2

Inventor:
James W. Dawson,
By Dyrenforth, Lee, Chritton & Wiles,
Attys.

Patented July 22, 1930

1,770,900

UNITED STATES PATENT OFFICE

JAMES W. DAWSON, OF STICKNEY, ILLINOIS, ASSIGNOR TO BERNARD G. BRENNAN, OF CHICAGO, ILLINOIS

VALVE

Application filed December 9, 1926. Serial No. 153,552.

This invention relates particularly to valves; and the primary object is to provide an improved valve capable of holding, without leakage, heavy fluid pressures, but capable, nevertheless, of being operated with great facility.

Further objects are to provide a valve device which can be readily assembled and in which the valve proper can be ground without removal from the casing.

The valve is well suited for use in connection with steam pipes, water pipes, or the like, carrying heavy pressures. However, it may be used wherever found desirable.

The invention is illustrated in its preferred embodiment in the accompanying drawings, in which—

Fig. 1 is a broken elevational view of the improved valve device applied to a pressure line; Fig. 2, a transverse sectional view taken as indicated at line 2 of Fig. 3; and Fig. 3, a vertical sectional view taken as indicated at line 3—3 of Fig. 1.

In the preferred embodiment which is illustrated, A designates a valve-casing which is provided with a lateral extension A' in which is mounted an actuating stem; B designates a valve-proper, housed within the casing and adapted to be actuated through the medium of a stem, or shaft, B', journalled in the casing-extension A'; and C, C' designate joints of a pipe-line in which the valve-casing is interposed.

In the example illustrated, the casing A comprises a main cylindrical body-portion $A^2$ having the lateral extension A' formed integral therewith; and an end-plate $A^3$ detachably connected to the body-portion by means of cap-screws 1.

Opposite the end-plate $A^3$, the casing is provided with an integral end-wall 2 provided with a hollow threaded boss $2^a$ into which the pipe-section C' is screwed. The plate $A^3$ is provided centrally with a hollow internally threaded boss 3 into which the pipe-section C is screwed.

The valve B preferably is a hollow ball-valve having truncated sides, as indicated at 4. From one of these side walls projects a short stem $4^a$ having a squared or faceted extremity which is received loosely in a squared portion of a socket with which the enlarged inner end-portion 5 of the actuating stem B' is equipped.

The chamber 6 of the ball-valve communicates with passages $6^a$ which extend through spherical portions of the wall of the valve. The internal chamber 6 of the valve is simply an enlargement of the bores $6^a$, and such enlargement is not a necessary feature.

The ball seats near the discharge end of the casing on a valve-seat 7 which is provided with a concavity $7^a$ which is of part-spherical form. The valve-seat 7 is provided with a short hub $7^b$ which is journalled in the end of the valve-casing. The stem $7^b$ is tubular, thus affording a passage $7^c$. The valve-seat preferably is revoluble and is equipped at its periphery with a worm-gear $7^d$ which is engaged by a worm 8 journalled in one side of the lower portion of the casing and provided with an actuating stem having a squared extremity $8^a$ adapted to receive a crank. By this means, the valve-seat 7 may be turned on its axis to enable the ball-valve and its seat to be ground together in situ. It will be noted that the passage $7^c$ is in alignment with the pipe-section C'.

At its upper side, the valve is engaged by a presser-member 9 which has a concavity $9^a$ of part-spherical form, conforming to the ball. The member 9 is tubular, thus having a bore $9^b$ which is in alignment with the bore of the pipe-section C. The member 9 is capable of longitudinal movement within a tubular guide-extension 10 which projects inwardly from the end-plate $A^3$. Also, the member 9 is equipped at its inner end with a peripheral flange $9^c$ between which and the end-plate $A^3$ is interposed a coil-spring 11 adapted to press the member 9 against the ball and cause the ball to be firmly seated in the valve-seat 7. Between the shank of the member 9 and an internal shoulder with which the tubular extension 10 is provided is a yielding packing, or gasket, 12.

The body $A^2$ of the valve-casing is externally flanged at its upper end, and between this flange and the peripheral portion of the end-plate $A^3$ is a gasket 13.

The lateral extension A' of the casing is in the form of a hollow embossment formed integrally with the side wall of the casing. The side wall is thickened, as indicated at 14 and is provided with a perforation 14$^a$ through which the stem, or shaft, B' extends. The head-portion 5 of said stem is provided with a conical bearing surface 5$^a$ which engages a corresponding bearing surface with which the wall 14 is provided at the inner end of the perforation 14$^a$.

The hollow embossment which forms the extension A' is provided at its outer end with an annular wall, or flange, 15 equipped with a segment 15$^a$ supplied with graduations 15$^b$. Screwed onto the shaft B' is a disk 16 which is secured in position by a lock-nut 17$^a$. The disk 16 is free to rotate in the bore 15$^c$ of the annular wall 15. Between the disk 16 and a washer 17 freely mounted on the shaft B' is a coil-spring 18 which serves to maintain close contact at the bearing 5$^a$. As shown, the disk 17 bears against an anti-friction device 19, which, in turn, bears against the thickened wall 14.

The worm 8 is provided with suitable bearings 20 and 21, one which is shown removable.

The valve-casing is shown equipped with an oil cup 22 which communicates through a hollow stem 23 with the interior of the casing. Thus, oil, or other lubricant, may be introduced into the lower portion of the valve-casing. If desired, the oil may be allowed to stand at a level above the valve-seat, so that a film of lubricant may be maintained between the ball-valve and the valve-seat. Such a film aids in maintaining a fluid-tight joint.

The operation of the improved valve device will be readily understood. The hollow ball-valve is maintained in close contact with the valve-seat at all times through the pressure exerted by the spring-pressed member 9. When the valve is in the closed position illustrated in Fig. 3, if we assume steam pressure, for example, to be in the pipe-section C, the valve will be additionally pressed against the seat 7 by the pressure in the steam line.

The valve may be turned from the closed position to the open position, and vice versa, through the medium of the actuating stem B', which may be equipped with any suitable actuating means. In the illustration given, the stem B' is shown equipped at its outer end with an actuating handle 24. This handle is shown equipped with a pointer 24$^a$ which co-acts with the dial-segment 15$^a$. It is noted that the connection between the stem, or shaft, B' and the short stem 4$^a$ of the ball-valve is sufficiently loose to avoid interference with the proper seating of the valve. When desired, the valve-seat 7 may be revolved on its axis to produce a grinding in of the valve with relation to the seat. Such rotation tends to free the valve-seat from any foreign substances which may become lodged therein. It will be noted that the connection between the stem B' and the lateral stem 4$^a$ of the valve is sufficient to maintain the valve substantially in the plane illustrated in Fig. 3. That is, this connection will prevent the valve from rocking side wise, as viewed in Fig. 3, but will permit the necessary self-adjustment of the valve with relation to its seat, and also will enable the valve to be turned about an axis coincident with the axis of the shaft B'.

The ability of the improved valve to withstand heavy pressures of fluids, including steam, without leakage, has been fully demonstrated. The construction is staunch, and the parts of the valve device can be readily assembled.

It may be added that the passage between the pipe-section C and the pipe-section C' is self-adjusting in the sense that the presser-member 9 can follow the valve to maintain it properly seated, regardless of wear. Also, while the ball-valve will ordinarily prevent any escape of fluid out of the internal conduit afforded by the valve-seat 7, the presser-member 9, and the interposed ball-valve, the actuating shaft 5 has its head-portion so seated and is so maintained by the spring 18 as to preserve a fluid-tight joint. Therefore, even should any pressure escape into the chamber of the valve-casing, escape past the actuating shaft B' is effectively provided against.

The bearing for one end of the shaft of the worm 8 is shown as having the form of a large cap-screw provided at its inner end with a bore which receives the end of the shaft. The detail of the bearing at the other end-portion of the shaft does not illustrate a packing, but, obviously, a packing may be employed, if desired.

In the illustration given, the passage through the valve-casing is shown as a rectilinear passage. Obviously, the discharge passage from the casing may be at an angle with respect to the inlet passage, if desired. For example, a right angle passage through the valve-casing, or any other desired angle, may be employed, the passage through the ball-valve being correspondingly changed to meet the requirements. This will be obvious to those skilled in the art.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In a valve device, a valve-casing provided with an inlet passage and an outlet passage, a valve-seat associated with the outlet passage and provided with a concavity affording a seating surface, an opposed spring-held presser-member having a passage therethrough communicating with the inlet passage of the casing and having a concavity affording a seating surface, an interposed rotary valve having a passage therethrough, means for rotating said valve to open and close the same, and means for turning in one plane the first mentioned valve-seat with respect to the casing and rotary valve.

2. A valve device comprising a casing equipped internally with a rotary valve-seat and an opposed presser-member, said valve-seat and presser-member having passages extending therethrough and being provided with part spherical concavities, an interposed ball-valve having a passage therethrough, means for rotating said valve to effect opening and closing thereof, and means for rotating said valve-seat to effect grinding in of the valve.

3. A valve device comprising a valve-casing equipped internally with a rotatable valve-seat, a valve engaging said seat, said valve-seat and valve being provided with co-acting concavity and convexity, a spring-pressed presser-member within the valve-casing adapted to engage said valve and press the same against the valve-seat, and means for rotating said valve-seat to effect grinding in of the valve with relation to the seat.

4. A valve device comprising a casing, an internal rotary valve-seat, an opposed presser-member, an interposed ball-valve, said presser-member and valve-seat having part-spherical concavities engaging said valve to open and close the same, and means for rotating said valve-seat to effect grinding in of the valve with relation to the valve-seat.

5. A valve device comprising a valve-casing having a wall provided with an outlet passage, a valve-seat having a hub-portion journalled in said outlet passage, said valve-seat being provided with a part-spherical concavity affording a seating surface, a ball-valve conforming to said seating surface, an inlet conduit equipped with means for pressing said valve against said seat, and means for rotating said valve-seat to effect grinding in of the valve with relation to the valve-seat.

6. A valve comprising a casing, a valve seat thereon, a valve rotatable on said seat, and means for rotating said valve seat with respect to said valve to effect grinding of the valve.

7. A valve comprising a casing, a valve seat thereon, a valve rotatable on said seat, and means for rotating said valve seat in the same plane about an axis lying substantially at right angles to the axis of said valve.

8. In a valve device, a valve-casing provided with an inlet passage and an outlet passage, a valve-seat associated with the outlet passage and provided with a concavity affording a seating surface, an opposed member having a passage therethrough communicating with the inlet passage of the casing and having a concavity affording a seating surface, an interposed rotary valve having a passage therethrough, means for rotating said valve to open and close the same, and means for turning in one plane the first mentioned valve-seat with respect to the casing and rotary valve.

9. In a valve device, a valve casing provided with an inlet passage and an outlet conduit, a valve seat within the casing having a passage therethrough communicating with said outlet conduit, said valve seat being provided with a concavity affording a seating surface, an opposed spring-held presser member having a passage therethrough communicating with the inlet passage of the casing and having a concavity affording a seating surface, an interposed rotary valve having a passage therethrough, means for rotating said valve to open and close the same, and means for turning in one plane the first mentioned valve seat with respect to the casing, the outlet conduit and the rotary valve.

10. In a valve device, a valve casing provided with an inlet passage and an outlet conduit, a valve seat within the casing having a passage therethrough communicating with said outlet conduit, said valve seat being provided with a concavity affording a seating surface, an opposed member having a passage therethrough communicating with the inlet passage of the casing and having a concavity affording a seating surface, an interposed rotary valve having a passage therethrough, means for rotating said valve to open and close the same, and means for turning in one plane the first mentioned valve seat with respect to the casing, the outlet conduit and the rotary valve.

11. A valve device comprising a casing having inlet and outlet conduits, said casing being equipped internally with a rotary valve seat and an opposed presser member having passages extending therethrough communicating with said inlet and outlet conduits, said valve seat and presser member each being provided with part spherical concavities, an interposed ball valve having a passage therethrough, means for rotating said valve to effect opening and closing thereof, and means for rotating said valve seat relative to said casing and said outlet conduit to effect grinding in of the valve.

12. A valve device comprising a valve casing equipped internally with a rotatable valve seat, a valve engaging said seat, said valve seat and valve being provided with coacting concavity and convexity, a spring-pressed presser member within the valve casing adapted to engage said valve and press the same against the valve seat, an outlet conduit communicating with said valve seat, and means for rotating said valve seat relative to said outlet conduit and said valve to effect grinding in of the valve with relation to the seat.

13. A valve device comprising a casing, an internal rotary valve seat, an outlet conduit communicating with said rotary valve seat, an opposed presser member, an interposed ball valve, said presser member and valve seat having part spherical concavities engaging said valve to open and close the same, and means for rotating said valve seat relative to said ball valve and said outlet conduit to effect grinding in of the valve with relation to the valve seat.

14. A valve device comprising a valve casing having a wall provided with an outlet conduit, a valve seat having a hub portion journalled in said casing adjacent said outlet conduit, said valve seat being provided with a part spherical concavity affording a seating surface, a ball valve conforming to said seating surface, an inlet conduit equipped with means for pressing said valve against said seat, and means for rotating said valve seat relative to said ball valve and said outlet conduit to effect grinding in of the valve with relation to the valve seat.

15. A valve comprising a casing, a valve seat thereon, a valve rotatable on said seat, an outlet conduit leading from said valve seat, and means for rotating said valve seat with respect to said outlet conduit and said valve to effect grinding in of the valve.

16. A valve comprising a casing, a valve seat thereon, a valve rotatable on said seat, an outlet conduit leading from said valve seat, and means for rotating said valve seat relative to said outlet conduit in one plane about an axis lying substantially at right angles to the axis of said valve.

JAMES W. DAWSON.